(12) United States Patent
Wang et al.

(10) Patent No.: US 9,961,079 B1
(45) Date of Patent: May 1, 2018

(54) CONTEXT AWARE INTRUDER DETECTION USING WIFI MAC ADDRESSES

(71) Applicant: Symantec Corporation, Mountain View, CA (US)

(72) Inventors: Qiyan Wang, Mountain View, CA (US); Anand Kashyap, Pune (IN)

(73) Assignee: Symantec Corporation, Mountain View, CA (US)

(*) Notice: Subject to any disclaimer, the term of this patent is extended or adjusted under 35 U.S.C. 154(b) by 45 days.

(21) Appl. No.: 14/222,447

(22) Filed: Mar. 21, 2014

(51) Int. Cl.
*H04L 29/06* (2006.01)
*H04W 12/08* (2009.01)

(52) U.S. Cl.
CPC ......... *H04L 63/0876* (2013.01); *H04W 12/08* (2013.01)

(58) Field of Classification Search
None
See application file for complete search history.

(56) References Cited

U.S. PATENT DOCUMENTS

| | | | | |
|---|---|---|---|---|
| 6,166,633 A * | 12/2000 | Wang | ............... | G08B 29/24 340/506 |
| 6,778,542 B1 * | 8/2004 | Hassan-Ali | ......... | H04L 12/5601 370/252 |
| 7,818,790 B1 * | 10/2010 | Burns | ............... | H04L 63/08 713/193 |
| 2002/0013723 A1 * | 1/2002 | Mise | ............... | G06Q 20/401 705/304 |
| 2008/0049649 A1 * | 2/2008 | Kozisek | ............... | H04L 45/125 370/310 |
| 2008/0052384 A1 * | 2/2008 | Marl | ............... | H04L 12/2807 709/223 |
| 2013/0227689 A1 * | 8/2013 | Pietrowicz | ............... | G01R 1/20 726/23 |
| 2013/0331083 A1 * | 12/2013 | Oslund | ............... | H04W 12/08 455/419 |

OTHER PUBLICATIONS

Stores Sniff Out Smartphones to Follow Shoppers http://www.technologyreview.com/news/520811/stores-sniff-out-smartphones-to-follow-shoppers/.
Wireless intrusion detection system http://www.airtightnetworks.com/fileadmin/pdf/whitepaper/ServivingAirborneThreats.pdf.

* cited by examiner

*Primary Examiner* — Huy D Vu
*Assistant Examiner* — Bao G Nguyen
(74) *Attorney, Agent, or Firm* — Maschoff Brennan

(57) ABSTRACT

A method and system for intruder detection is provided. The method includes generating a whitelist of media access control (MAC) addresses of a plurality of wireless devices that are acceptable in a detection zone of a wireless router and detecting, by the wireless router, a further wireless device. The method includes issuing a notification in response to absence, on the whitelist, of a media access control address of the further wireless device, the notification indicating a physical intruder within the detection zone, wherein at least one action of the method is performed by a processor in or coupled to the wireless router.

20 Claims, 4 Drawing Sheets

CONTEXT AWARE INTRUDER DETECTION USING WIFI MAC ADDRESSES

BACKGROUND

Intruder detection systems often require installation of specialized equipment and wiring, including various sensors and power supplies. Sensors for intruder detection systems generally fall in two major categories. A first category is hardwired sensors, such as window switches, door switches and floor pads. A second category is area-based noncontact sensors, such as ultrasound transceivers and infrared detectors. Each category of sensors has advantages and disadvantages. The installation process for an intruder detection system may be expensive to a user and disruptive to the home or business environment. Further, professional burglars may be able to defeat known, familiar sensor and wiring installations.

It is within this context that the embodiments arise.

SUMMARY

In some embodiments, a method for intruder detection is provided. The method includes generating a whitelist of media access control (MAC) addresses of a plurality of wireless devices that are acceptable in a detection zone of a wireless router and detecting, by the wireless router, a further wireless device. The method includes issuing a notification in response to absence, on the whitelist, of a media access control address of the further wireless device, the notification indicating a physical intruder within the detection zone, wherein at least one action of the method is performed by a processor in or coupled to the wireless router.

In some embodiments, a tangible, non-transitory, computer-readable media having instructions thereupon which, when executed by a processor, cause the processor to perform a method. The method includes extracting a media access control (MAC) address, via a wireless router, from each of at least one wireless device, during a learning mode and writing the media access control address of each of the at least one wireless device to a whitelist. The method includes extracting a media access control address, via the wireless router, from a wireless device, during an intruder detection mode and determining whether the media access control address of the wireless device is included in the whitelist. The method includes issuing an alert responsive to determining that the media access control address of the wireless device is not included in the whitelist.

In some embodiments, an intruder detection system is provided. The system includes a wireless router, configured to detect wireless devices within a detection zone of the wireless router and a media access control address monitor, configured to obtain media access control (MAC) addresses of the detected wireless devices. The system includes a notification module configured to issue a notification in response to being triggered and a memory, configured to store a whitelist. The system includes an analytics module, configured to add a media access control address of a wireless device detected within the detection zone during a training time to the whitelist, and further configured to trigger the notification module responsive to the media access control address monitor obtaining a media access control address of a wireless device detected within the detection zone outside of the training time and not on the whitelist.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

An intruder detection system and related method are herein described. The intruder detection system makes use of a wireless router, specially configured to analyze media access control (MAC) addresses of wireless devices in the vicinity of the wireless router. The system develops and maintains a whitelist, or some other suitable list, of the media access control addresses of accepted wireless devices. When a wireless device, with a media access control address, is detected, the system looks to see if the media access control address is present on the whitelist. If not, a notification or alert is generated. In this manner, an intruder carrying a wireless device with an unknown (i.e., not present on the whitelist) media access control address can be detected. Updates to the whitelist are performed under certain circumstances, such as upon the occurrence of a false alarm, or contemporaneous detection of a not yet whitelisted wireless device and a whitelisted wireless device, etc.

Figure 1:
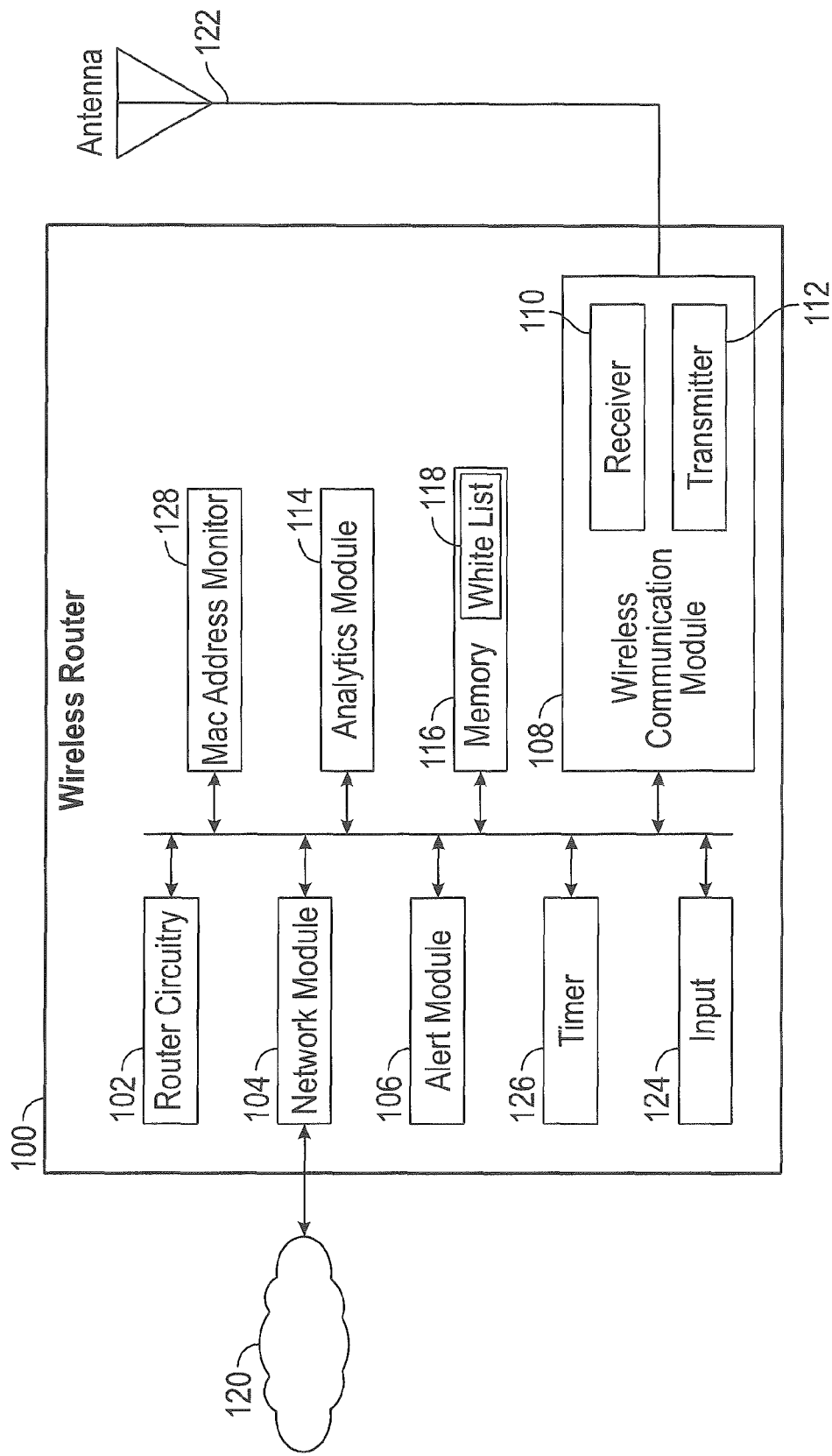
FIG. 1 is a system diagram of a wireless router configured for intruder detection, in accordance with some embodiments.

FIG. 1 is a system diagram of a wireless router 100 configured for intruder detection, in accordance with an embodiment of the present disclosure. Embodiments of the wireless router 100 can be created by adding programming and/or specialized components to a standard wireless router, as used in a home or business to wirelessly route a coupling to a network 120 in some embodiments. The embodiments for the wireless router can be created by implementing a wireless router with specialized programming and/or components anew. In one embodiment as shown, the wireless router 100 includes router circuitry 102, a network module 104, an alert module 106, a wireless communication module 108, an analytics module 114, a memory 116, and a media access control address monitor 128, which can communicate amongst themselves on a bus or other connections. The network module 104 of the wireless router 100 couples to a network, such as a local area network (LAN) or a global communication network such as the Internet, through well-established and understood mechanisms. Router circuitry 102 of the wireless router 100 manages the network module 104 and the wireless communication module 108. Among other tasks, the router circuitry 102, the network module 104, and the wireless communication module 108 handle the wireless routing of data to and from any wireless devices that couple to the wireless router 100, similarly to a standard wireless router. The wireless communication module 108 includes a receiver 110 and a transmitter 112, or a transceiver, etc. The receiver 110 and transmitter 112 are coupled to an antenna 122, which is used to wirelessly transmit and receive, as is well-known for other wireless routers. The media access control address monitor 128 monitors media access control addresses of wireless devices, as obtained via the wireless communication module 108 and the antenna 122.

Still referring to FIG. 1, a media access control address, from the media access control address monitor 128, is evaluated or analyzed by the analytics module 114. In a learn mode or training mode, the analytics module 114 takes media access control addresses from the media access control address monitor 128, and puts these into the whitelist 118, which is maintained in the memory 116. For example, a user could place the wireless router 100 into learn mode or training mode, and the analytics module 114 then places media access control addresses of any wireless devices, which have media access control addresses and are within a detection zone of the wireless router 100, into the whitelist 118. In an intruder detection mode, the analytics module 114 takes media access control addresses from the media access control address monitor 128, and determines whether or not these media access control addresses are in the whitelist 118. For example, a user could place the wireless router 100 into intruder detection mode, and the analytics module 114 then compares media access control addresses of any wireless devices, which have media access control addresses and are within a detection zone of the wireless router 100, to the whitelist 118. In intruder detection mode, any such media access control address from a nearby wireless device that is not found on the whitelist 118 results in the analytics module 114 triggering the alert module 106.

Portions or all of the analytics module 114 of FIG. 1 could be implemented as software executing on a processor, which could be a processor that is further used in other aspects of the wireless router 100, i.e., a processor in or coupled to the wireless router 100, or could be a processor dedicated to the analytics functions. Portions of the analytics module 114 could be implemented in hardware, firmware, software, or combinations thereof. It should be appreciated that a processor may refer to a programmable logic device or a microprocessor in some embodiments. When the analytics module 114 detects an intruder, as discussed above and further described below with reference to FIG. 2, the analytics module triggers the alert module 106 of the wireless router 100. The alert module 106 then issues a notification. The notification could be in the form of lighting a lamp, issuing an alarm sound, or sending a message or other notification out via the network module 104 to the network 120, e.g., to a destination device or agency, among other options, as will be further discussed with reference to FIG. 3.

Some embodiments of the wireless router 100 of FIG. 1 can have one or more input devices 124, such as buttons, switches, a touchscreen, an input port, and so on. An input device 124, in such embodiments, can be used to activate learn mode, deactivate learn mode, activate intruder detection mode, deactivate intruder detection mode, initiate a delayed activation of intruder detection mode, and/or perform, initiate or terminate other functions in response to a user request. Some embodiments of the wireless router 100 have a timer 126. The timer 126 is applied to timing intervals while monitoring media access control addresses. The timer could thus be applied during a training or learning mode, in order to gauge time lengths of device presences and apply these to the whitelist 118. For example, if a wireless device is present for less than a specified time, the media access control address would not be added to the whitelist 118. The timer 126 could be applied during intruder detection mode, in order to gauge a time length of a presence of a wireless device, for determination of whether to trigger the alert module 106. For example, the timer could be used to establish a minimum time for an intruder positive detection signal. Detection of a wireless device for less than this minimum time would not trigger an alert. Alternatively, the timer 126 could be applied to starting and stopping, e.g., scheduling, the intruder detection mode, or any of the other modes.

Figure 2:
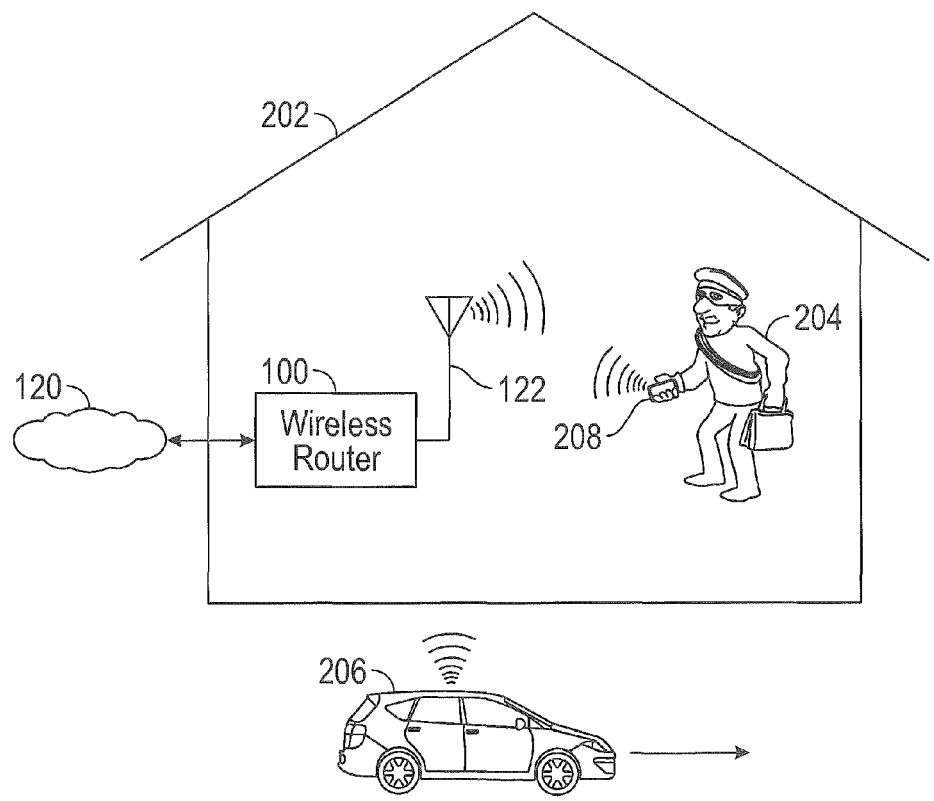
FIG. 2 is a scenario diagram, showing the wireless router of FIG. 1 detecting an intruder in a house or business in accordance with some embodiments.

FIG. 2 is a scenario diagram, showing the wireless router 100 of FIG. 1 detecting an intruder 204 in a house 202 or business, or other locale. A distinction is herein made between detecting a physical intruder 204, versus detecting an electronic intruder such as a hacker, which can be addressed by other systems. Here, the wireless router 100 is operating in a monitoring mode, passively listening to wireless traffic such as Wi-Fi (wireless fidelity). The wireless router 100 can receive Wi-Fi packets in this mode, and determine media access control addresses of devices in the vicinity, i.e., within the detection zone of the wireless router 100. In this manner, the wireless router 100 can determine the media access control address of a wireless device 208 of the intruder 204 (provided, of course, that the wireless device 208 is active, functioning properly, and has a media access control address). The specially configured wireless router 100 could then compare the media access control address of the wireless device 208 to the whitelist 118. If the media access control address of the wireless device 208 is not found on the whitelist 118, i.e., is absent from the whitelist 118, the wireless router 100, more particularly the alert module 106, could send a notification out on the network 120, e.g., via the network module 104 of the wireless router 100.

Referring to FIGS. 2 and 1, the wireless router 100, and more specifically the analytics module 114, can develop the whitelist 118 during a learn mode or training mode over a specified span of time. If there is a false alarm, such as when a wireless device has a media access control address not found in the whitelist 118 but a user later indicates this is a false alarm, the analytics module 114 can update or modify the whitelist 118 with the new learning. For example, a user could receive a notification to a cell phone, and send back a command or message that this is a false alarm, as the user recalls that relatives or friends are visiting. Alternatively, the user could review a history, and indicate that certain events are false alarms, e.g. via a graphical user interface (GUI). As explained further below, the wireless router 100 could monitor media access control addresses of wireless devices when not in training mode and not in intruder detection mode, and learn about various events and patterns of activity such as the automobile 206 (with a driver or passenger using a wireless device) driving by, people (carrying wireless devices) walking past the house, neighboring wireless devices, etc. A user could invoke training mode, and the analytics module 114 can develop the whitelist 118 by adding media access control addresses of wireless devices detected during the training mode.

For example, the wireless router 100 can detect wireless devices of the homeowner, devices of guests, devices of neighbors, devices of people passing by, and a wireless device 208 of an intruder 204. Context information is applied to determine whether a detected device is a wireless device 208 of an intruder 204. The timer 126 can be applied when monitoring wireless devices, so that wireless devices of passersby, which are present on the network for less than a specified time span, e.g., one minute, could be excluded from triggering an alarm. Wireless devices of an owner are whitelisted at initialization, e.g., during learn mode or training mode, in some embodiments. Wireless devices can be learned and whitelisted over time in some embodiments. For example, if an unknown wireless device and a known, whitelisted wireless device are present on the network at the same time, this could indicate that an owner and a friend or associate are present together, i.e., their devices are accompanying one another as a result of the mutual presence of the owners of the devices. Under such circumstances, the unknown device could be validated as a guest device, and the media access control address indicated as validated. If a validated wireless device is present for longer than a specified time span, e.g., if a wireless device of a neighbor and a wireless device of an owner are present for two or more hours, the validated device could be added to the whitelist 118. A presence pattern of whitelisted devices can be learned by the analytics module 114 in order to improve detection accuracy. For example, the analytics module 114 could infer that an owner is asleep between 12 AM and 7 AM because the specified wireless device of the owner is idle and has no activity during such time. Once an idle time is determined in a presence pattern, the analytics module 114 could declare that the system is in intruder detection mode during a subsequent idle time, and monitor for unknown wireless devices, triggering an alarm if an intrusion is detected. In some embodiments, the presence patterns and any of the learning associated with the modules of wireless router 100 may be stored in memory 116 or some external memory coupled to the wireless router for subsequent use.

Figure 3:
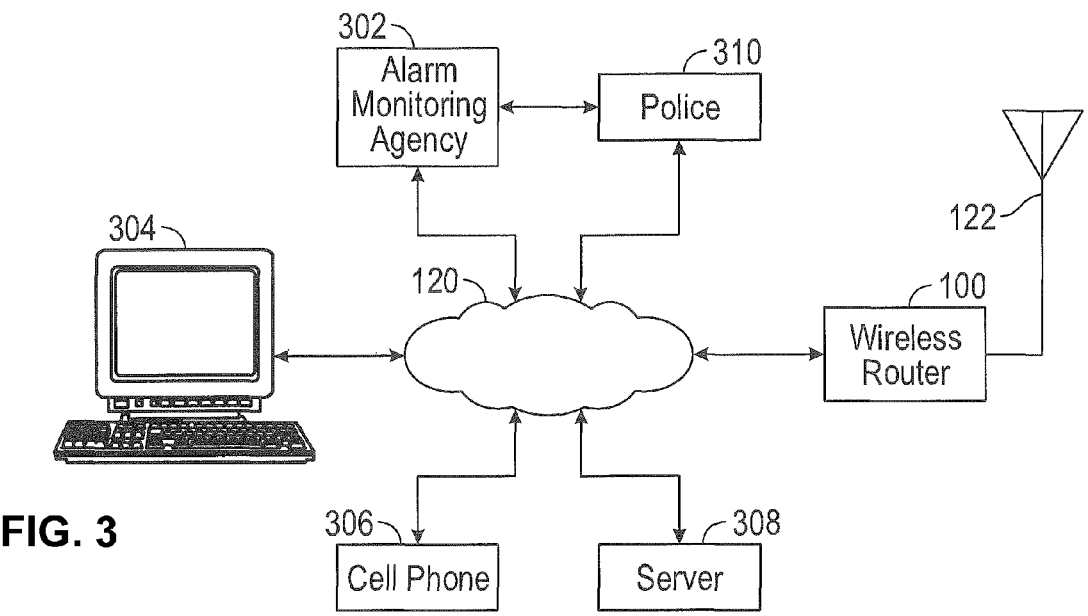
FIG. 3 is a system diagram, showing the wireless router of FIG. 1 coupled to a network and various devices in accordance with some embodiments.

FIG. 3 is a system diagram, showing the wireless router 100 of FIG. 1 coupled to a network 120 and various devices 304, 306, and 308. As discussed above, the wireless router 100, and more specifically the alert module 106, could send a notification out via the network module 104 to the network 120. The notification could have an address of a server 308, so that the notification can be posted on the server 308. In some embodiments, the server 308 could act on receiving such a notification, and send a text message to a cell phone 306, an email to a computing device 304, a text message, a digitized or synthesized voice message, a document or other notification to an alarm monitoring agency 302 or the police 310, or otherwise send alerts or notifications. In some embodiments, the wireless router 100 can send such notifications directly to the cell phone 306, the computing device 304, the alarm monitoring agency 302 or police 310, or elsewhere. In some embodiments, a user could couple to the server 308, using a cell phone 306 via the network 120, in order to receive or check for an intruder alert per the notification from the alert module 106. For example, the alert module 106 could send a notification to the server 308, via the network 120. The server 308 could then send a text message via the network 120 to the cell phone 306. A user of the cell phone 306 could then couple via the network 120 to the server 308, to verify or obtain further details about the notification. In further examples, the server 308 or the wireless router 100 could broadcast the notification to multiple destinations. It should be appreciated that server 308 may be a backend server of the assignee in some embodiments.

Figure 4:
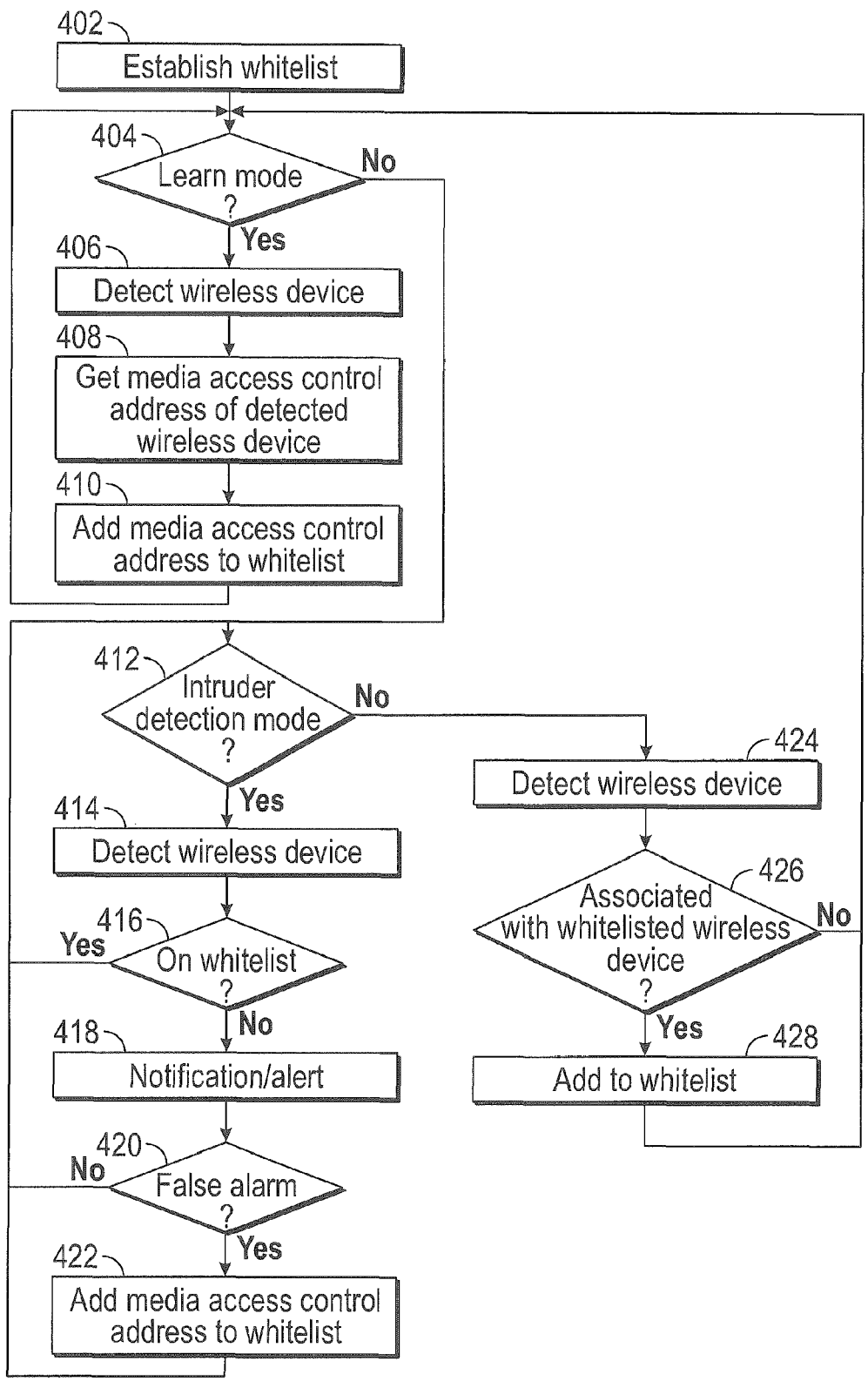
FIG. 4 is a flow diagram, showing a method of detecting an intruder, which can be practiced on embodiments of the specially configured wireless router of FIG. 1 in accordance with some embodiments.

FIG. 4 is a flow diagram, showing a method of detecting an intruder, which can be practiced on embodiments of the specially configured wireless router 100 of FIG. 1. Many or all of the actions of the flow diagram in FIG. 4 can be performed by or using a processor, such as a processor in the wireless router 100 or a processor coupled to the wireless router 100. Variations and further embodiments of the depicted method are readily devised in accordance with the teachings disclosed herein. The method could be embodied on a tangible, non-transitory, computer-readable media. In an action 402, a whitelist is established. For example, the wireless router 100 could be shipped with a blank whitelist 118, which is later populated upon installation by a user. Or, the wireless router 100 could establish and populate the whitelist 118 upon power up or entry to training mode.

In a decision action 404 of FIG. 4, it is determined if the system is in learn mode. If the system is not in learn mode, flow branches to the decision action 412. If the system is in learn mode, flow branches to the action 406. In an action 406, the system detects a wireless device. For example, the owner of the wireless router or the house or business could activate a Wi-Fi (wireless fidelity) equipped cell phone, laptop or other wireless device, within a detection zone of the wireless router, and the wireless router could detect this. In an action 408, the system gets the media access control address of the detected wireless device. For example, the media access control address monitor could obtain the media access control address of the detected wireless device from the wireless communication module, and pass this to the analytics module. It should be appreciated that each device is assigned a unique media access control address. A media access control address (MAC address) is a unique identifier assigned to network interfaces for communications on the physical network segment. MAC addresses are used as a network address for most network technologies, including Ethernet. Logically, MAC addresses are used in the media access control protocol sub-layer of the Open System Interconnection (OSI) reference model.

Still referring to FIG. 4, in an action 410, the media access control address is added to the whitelist, as the system learns accepted devices and populates the whitelist with the media access control addresses of these devices. Flow branches back to the decision action 404, to determine if learn mode is still in effect. If learn mode is not active or enabled, the decision action 412 poses the question, is the system in intruder detection mode? If the answer is no, flow branches to the action 424. If the answer is yes, flow branches to the action 414. In the action 414, a wireless device is detected, with the system in intruder detection mode. For example, this could be the detection of a wireless device of an intruder, or a known, accepted wireless device.

In a decision action 416, a question is asked, is the detected wireless device on the whitelist? If the answer is no, flow branches to the action 418. If the answer is yes, flow branches back to the decision action 412, to determine if the system is still in intruder detection mode. In an action 418, a notification or alert is issued. This is in response to the system detecting a wireless device, during intruder detection mode, which device is not on the whitelist. The notification or alert could take any of the forms discussed above, such as posting to a server, sending a text message to a cell phone, contacting an agency and so on. In a decision action 420, a question is asked, is this a false alarm? If the answer is yes, flow continues to the action 422. If the answer is no, flow branches back to the decision action 412, to determine if the system is still in intruder detection mode and continues as described above.

In the action 422 of FIG. 4, the media access control address of the wireless device detected during intruder detection mode is added to the whitelist. This is in response to such an address belonging to a device that was the subject of a false alarm. The whitelist is thus updated for improved accuracy. After the action 422, flow returns to the decision action 412, to determine if the system is still in intruder detection mode. In the action 424, which is arrived at if the system is not in intruder detection mode and not in learn mode, a wireless device is detected. In a decision action 426, a question is asked, is the detected wireless device associated with a whitelisted wireless device? For example, the detected wireless device and a wireless device that is whitelisted could be detected contemporaneously or within a specified time span. If the answer is no, flow branches back to the decision action 404, to determine if the system is in learn mode. If the answer is yes, flow branches to the action 428. In the action 428, the media access control address of the detected wireless device is added to the whitelist. This updates the whitelist for improved accuracy, so that the wireless device associated with the earlier whitelisted wireless device will not be identified as belonging to an intruder. After the action 428, flow branches to the decision action 404, to determine if the system is in learn mode and continues as described above.

Variations of the above method and flow are readily devised in accordance with the teachings disclosed herein. For example, the flow could have various other branches, or a start point or endpoint, updates could be arranged at other times or places within a flow, and variations to the flow or further details to the flow could be added.

Figure 5:
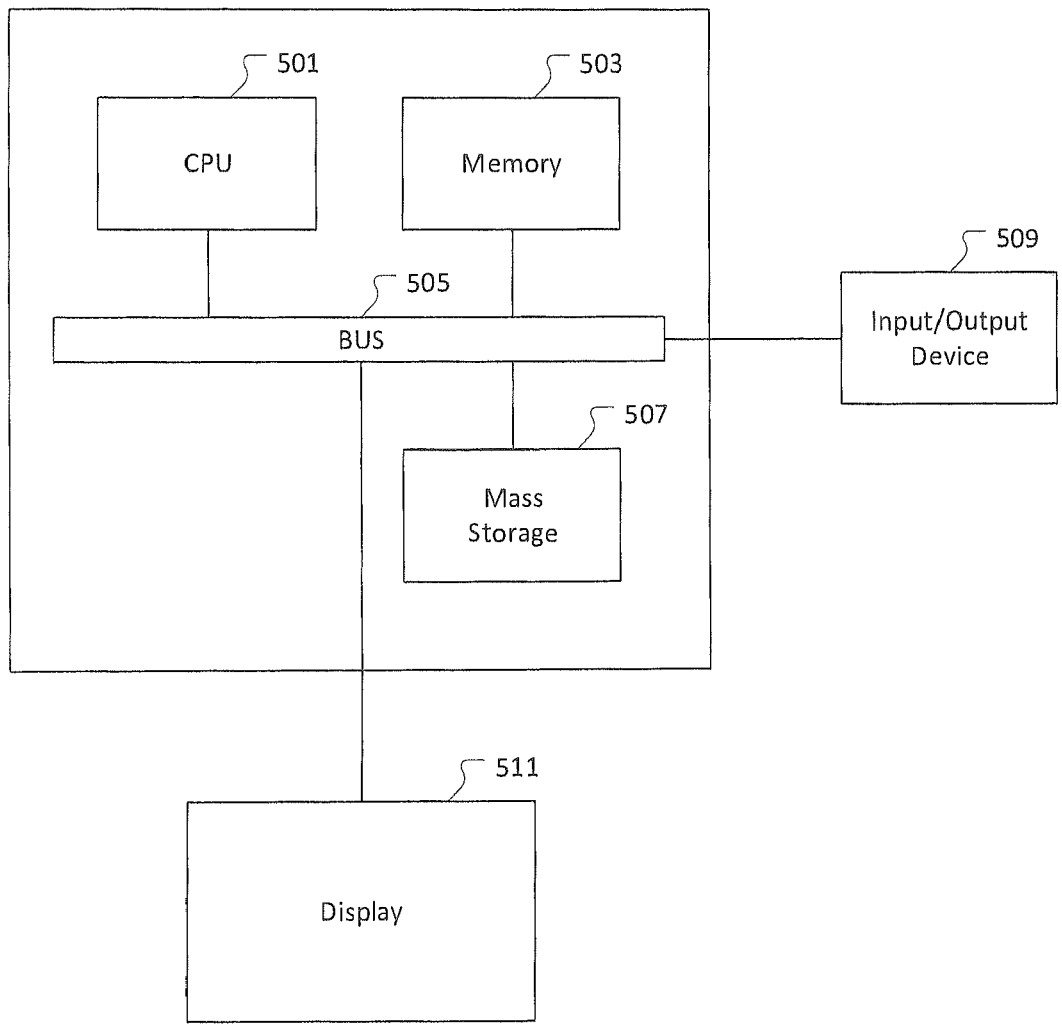
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for monitoring and analysis of media access control addresses in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for intruder detection, at least one action of the method performed by a processor in or coupled to a wireless router, the method comprising:
    generating a whitelist of media access control (MAC) addresses of a plurality of wireless devices that are acceptable in a detection zone of the wireless router, wherein the wireless router is configured to route data requested by wireless devices from a network to the wireless devices and route data, specified by users of the wireless devices, from the wireless devices to the network;
    automatically adding a MAC address of a first wireless device to the whitelist responsive to automatically detecting, by the wireless router, a second wireless device listed on the whitelist and the first wireless device not listed on the whitelist both simultaneously accompanying one another in the detection zone of the wireless router for longer than a threshold time period;
    detecting, by the wireless router, a third wireless device; and
    issuing a notification in response to absence, on the whitelist, of a MAC address of the third wireless device, the notification indicating a physical intruder within the detection zone.

2. The method of claim 1, further comprising:
    comparing the MAC address of the third wireless device to the whitelist, wherein a determination of the absence is based on the comparing.

3. The method of claim 1, wherein generating the whitelist includes gathering the MAC addresses of the plurality of wireless devices, via the wireless router, during a training time.

4. The method of claim 1, wherein the whitelist resides in a memory coupled to the wireless router.

5. The method of claim 1, wherein issuing the notification includes sending a text message to a mobile telephonic device.

6. The method of claim 1, wherein issuing the notification includes sending the notification to a server.

7. A tangible, non-transitory, computer-readable media having instructions thereupon which, when executed by a processor, cause the processor to perform a method comprising:
    extracting a media access control (MAC) address, via a wireless router, from each of at least one wireless device, during a learning mode, wherein the wireless router is configured to route data from a network to wireless devices and route data from the wireless devices to the network as directed by users of the wireless devices;
    writing the MAC address of each of the at least one wireless device to a whitelist;
    automatically placing the wireless router in an intruder detection mode during a reoccurring time period responsive to automatically detecting, by the wireless router, a first wireless device listed on the whitelist having a pattern of being idle during the reoccurring time period;
    extracting a MAC address, via the wireless router, from a second wireless device, during the intruder detection mode;
    determining whether the MAC address of the second wireless device is included in the whitelist; and
    issuing an alert responsive to determining that the MAC address of the second wireless device is not included in the whitelist.

8. The computer-readable media of claim 7, wherein the method further comprises:
    updating the whitelist responsive to a false alarm, to add to the whitelist a MAC address of a third wireless device associated with the false alarm.

9. The computer-readable media of claim 7, wherein the issuing the alert further comprises:
    sending a notification to a server.

10. The computer-readable media of claim 7, wherein the method further comprises:
  establishing a minimum time amount for an intruder positive, wherein a third wireless device detected present less than the minimum time amount is excluded from the alerting.

11. An intruder detection system, comprising:
  a wireless router, configured to route data from a network to wireless devices and route data directed by users of the wireless devices from the wireless devices to the network and configured to detect the wireless devices within a detection zone of the wireless router;
  a media access control (MAC) address monitor, configured to obtain MAC addresses of the detected wireless devices;
  a notification module configured to issue a notification in response to being triggered;
  a memory, configured to store a whitelist; and
  an analytics module, configured to:
    add a MAC address of a first wireless device detected within the detection zone during a training time to the whitelist;
    automatically add a MAC address of a second wireless device to the whitelist responsive to automatically detecting, by the wireless router, the first wireless device listed on the whitelist and the second wireless device not listed on the whitelist both simultaneously accompanying one another in the detection zone of the wireless router for longer than a threshold time period;
    automatically place the wireless router in an intruder detection mode during a reoccurring time period responsive to automatically detecting, by the wireless router, the first wireless device listed on the whitelist having a pattern of being idle during the reoccurring time period; and
    trigger the notification module responsive to the MAC address monitor obtaining a MAC address of a third wireless device detected within the detection zone during the intruder detection mode and not on the whitelist.

12. The intruder detection system of claim 11, further comprising:
  a timer, coupled to the analytics module, the timer and the analytics module configured to establish a minimum time amount for an intruder positive.

13. The intruder detection system of claim 11, further comprising:
  the notification module configured to send the notification to a server, wherein the server is configurable as to response to the notification.

14. The intruder detection system of claim 11, further comprising:
  the notification module configured to couple, via a network, to one of a server, an authority, or an agency.

15. The intruder detection system of claim 11, further comprising:
  the wireless router having a processor; and
  instructions enacting at least a portion of a configuration of the analytics module are resident in the wireless router and executable by the processor of the wireless router.

16. The intruder detection system of claim 11, further comprising:
  the analytics module configured to add the MAC address of the wireless device detected outside of the training time to the whitelist responsive to a false positive.

17. The method of claim 1, wherein:
  the second wireless device listed on the whitelist is designated as being owned by an owner of the wireless router; and
  the second wireless device and the first wireless device both simultaneously accompanying one another in the detection zone of the wireless router for longer than the threshold time period indicates that the first wireless device belongs to a friend or associate of the owner.

18. The computer-readable media of claim 7, wherein the method further comprises:
  automatically adding a MAC address of a third wireless device to the whitelist responsive to automatically detecting, by the wireless router, the first wireless device listed on the whitelist and the third wireless device not listed on the whitelist both simultaneously accompanying one another in a detection zone of the wireless router for longer than a threshold time period.

19. The computer-readable media of claim 18, wherein:
  the first wireless device listed on the whitelist is designated as being owned by an owner of the wireless router; and
  the third wireless device and the first wireless device both simultaneously accompanying one another in the detection zone of the wireless router for longer than the threshold time period indicates that the third wireless device belongs to a friend or associate of the owner.

20. The intruder detection system of claim 11, wherein:
  the first wireless device listed on the whitelist is designated as being owned by an owner of the wireless router; and
  the first wireless device and the second wireless device both simultaneously accompanying one another in the detection zone of the wireless router for longer than the threshold time period indicates that the second wireless device belongs to a friend or associate of the owner.

* * * * *